United States Patent Office 3,432,387
Patented Mar. 11, 1969

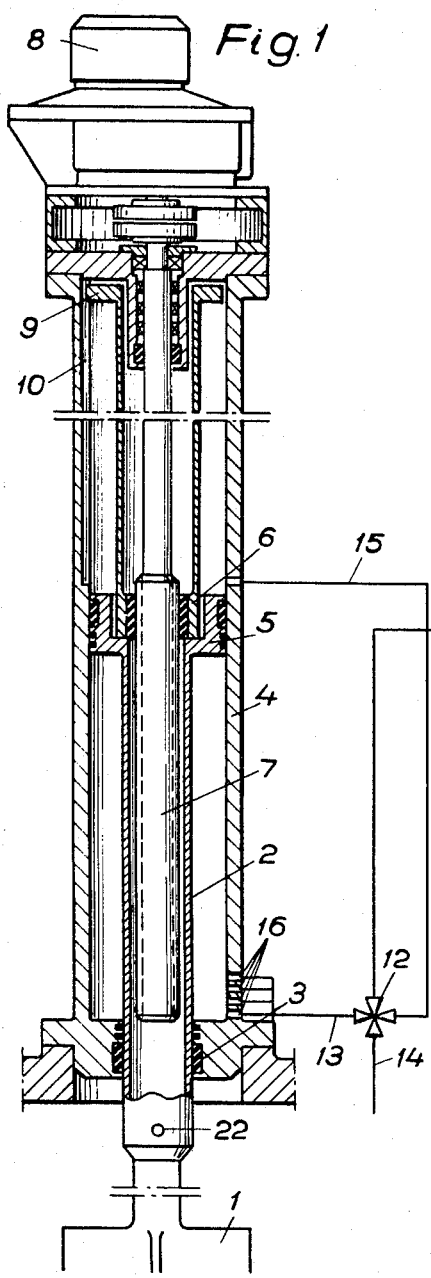
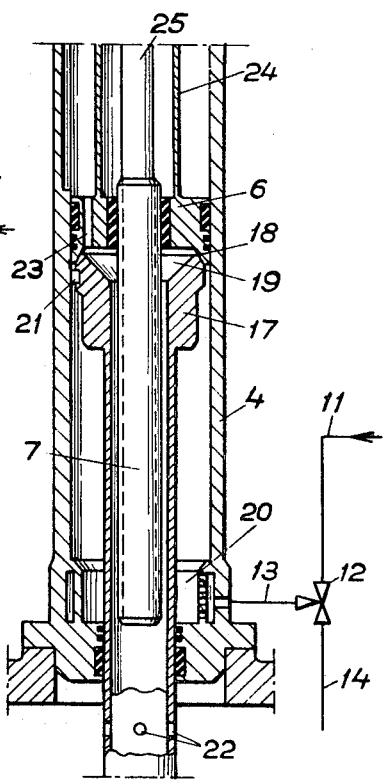

3,432,387
CONTROL DEVICE FOR A NUCLEAR REACTOR
Erik Jönsson, Vasteras, Sweden, assignor to Allmänna Svenska Elektriska Aktiebolaget, Vasteras, Sweden, a corporation of Sweden
Filed June 21, 1965, Ser. No. 467,191
Claims priority, application Sweden, July 2, 1964, 8,043/64
U.S. Cl. 176—36      4 Claims
Int. Cl. G21c 7/08

The present invention relates to a control device for nuclear reactors, which control device comprises a mechanical driving device for a control means movable at least substantially in a vertical direction.

In nuclear reactors the control means usually consist of control rods, which are inserted in the reactor core. In order to achieve the greatest possible safety it is known to arrange the control rods so that they are inserted from above and so that, when quick shutdown of the reactor is desired or when a fault occurs in the operating system of the control device, they fall down by their own weight into the reactor core and thereby shut down the reactor.

The object of the present invention is to effect a control device with the above given characteristics which is of a simple, robust construction with few moving parts. The invention is characterised in that the control means, i.e. the control rod or the like is fastened to an element carried by pressure medium in a cylinder, which element normally is pressed by the pressure medium against the part of the mechanical driving device which is driving the control means. By arranging the control device in this way the control means can in a very simple way during normal operation be supported by pressure medium in a cylinder at the same time as the mechanical driving device can be used for adjusting the position of the control means. The control means and the mechanical driving device are thus not permanently connected to each other, but are kept in position with respect to each other by the said pressure medium. When the control rod is to be quickly inserted into the reactor core, the control means can immediately be freed from the mechanical driving device by reducing the pressure of the pressure medium so that the former by its own weight falls down into the reactor core. If the pressure in the pressure system of the control device disappears because of a fault, the reactor is shut down automatically.

The element which is carried by the pressure medium and in its turn supports the control means can suitably be a piston enclosed in a cylinder, which piston is pressed by the pressure medium against the driving part of the mechanical driving device, for example a nut driven by a rotating screw. It is however not necessary that the said element be a piston. It can also consist of an element which seals against a seat which is fixed to the said drive nut or the like. The seat is arranged then to separate the space filled with pressure medium from a space with lower pressure, so that the pressure medium influences the element so that it is pressed against the seat as long as the pressure below the element is sufficiently high. The element is suitably made so that the pressure medium can flow between the element and the cylinder wall and for this purpose the element is dimensioned in relation to the cylinder so that a suitable falling speed is obtained when the element freely falls in the cylinder under the influence of the weight of the parts fastened to it.

In the following the invention will be described more closely with reference to the accompanying figures, of which FIG. 1 shows in axial section an embodiment of the invention and FIG. 2 also in axial section another embodiment of the invention.

In FIG. 1, 1 denotes the control means which has the form of a cross shaped control rod. The control rod is supported by a tube-like means 2, which extends through a packing 3 into the cylinder 4 where it is fixed to a piston 5 movable in the cylinder. The piston 5 bears against a driving nut 6, which is driven by a rotating screw 7, which in its turn is driven by the control device motor 8. The nut 6 is locked against rotation by an arm 9 fixed to the nut and extending into an axial groove 10 in the cylinder 4. The cylinder chamber above the piston 5 as well as the interior of the tubular means 2 may be under reactor pressure. The last mentioned space can be in direct connection through openings 22 beneath the packing 3 with the interior of the reactor.

From a pressure system pressure medium is fed under higher pressure than the reactor pressure through the conduit 11 to a control valve 12. In normal operation the control valve 12 is set so that the pressure medium through the conduit 13 is fed to the cylinder 4 below the piston 5 so that this is pressed against the nut 6 regardless of whether the nut moves upwards or downwards or stays still. When the reactor is to be quickly shut down, the control valve 12 is operated so that the space beneath the piston 5 is connected to the conduit 14, which can suitably be connected to the reactor or to a space with lower pressure. At the same time pressure medium with higher pressure can be supplied through the conduit 15 above the piston 5, but this is not necessary. However, it should be ensured that the cylinder space above the piston 5 is not completely closed so that there can be a partial vacuum which would prevent the piston from falling down. The falling speed can be controlled by pressure medium being fed to the upper cylinder space through a suitably throttled intake duct, for example from the conduit 14 through the valve 12 and the conduit 15.

When the pressure beneath the piston 5 falls to the level of the reactor pressure or lower, the control means 1 will fall down in the reactor core because of its own weight. This takes place regardless of the position of the nut 6. In order to dampen the speed of the control means when it reaches the bottom position, the outlet from the cylinder space below the piston 5 is arranged so that it is successively throttled, for example by several outlet openings 16 arranged axially after each other.

In FIG. 2 an embodiment is shown where the control means is not fixed to a piston, but to a head member element 17 with a smaller diameter than the free inner space of the cylinder or housing 4, and therefore a smaller cross-sectional area. Between the seat surface on upper side of the element 17 and the drive nut 6 a downwardly facing seat surface 18 is arranged, against which the seat surface of the element 17 seals, the pressure beneath the element 17 on a downward facing pressure surface thereof being higher than the pressure in the space 19 inside the seat 18. The space 19 is suitably under reactor pressure which is lower than the pressure which can be supplied through pipe 13. As long as the pressure below the element 17 on the pressure surface is sufficiently high, the element is pressed against the nut 6 so that it follows the nut and a good seal on the seat 18 is obtained. In the same way as in the embodiment according to FIG. 1, the pressure medium is fed to the cylinder 4 from a pressure medium system through a conduit 11 and a control valve 12 and a connection conduit 13. When the control valve 12 is operated so that the cylinder space below the element 17 is connected to the conduit 14 which has reactor pressure or lower pressure, the element 17 is no longer influenced by any supporting force. The element is then freed from the nut 6 and the control means falls down into the reactor core. When the element 17 falls down, the free space in the cylinder 4 is increased. Therefore pressure medium must be supplied and this can be supplied from the reactor through the openings 22 in the tube device 2. The element 17 is dimensioned in relation to the cylinder 4 so that on account of the flow resistance a suitable falling speed is obtained.

A hydraulic brake for the end position can also be arranged at this embodiment in the same way as in FIG. 1 in a constricted part 20 of the cylinder 4. The element 17 is suitably provided with centering control bosses 21 or corresponding guiding means. In the embodiment shown the drive nut 6 is made as a piston, sealing against the cylinder 3. The nut piston 6 is provided with a through-going channel 23, which makes it possible for the nut piston to move in the cylinder without it being necessary to arrange any outer pressure compensating connection corresponding to the conduit 15 in FIG. 1. The nut piston 6 is sealed against the cylinder wall so that the higher pressure below the element 17 will not be transmitted past the nut piston and into the space inside the tube collar 24 of the nut—which is not sealed—and further past the operating thread to the space 19. The operating thread, i.e. the thread connection between the nut 6 and the screw 7 cannot be effectively sealed, but it is possible instead of providing the piston with a packing to seal the tube collar 24 at the screw spindle 25. In such a case the channel 23 is omitted or is connected to the space inside the tube collar 24.

The invention is not limited to the embodiments shown but a plurality of variations and modifications are feasible within the scope of the following claims.

I claim:
1. Control device for a nuclear reactor, comprising a reactor core housing, a substantially vertically movable neutron absorbing means insertable into said reactor core housing, said control means having a head member and a neutron absorbing member and a tube member joining said head member and said neutron absorbing member, a closed second housing having an upper and a lower wall and at least one side wall, said second housing enclosing said head member, a substantially vertically movable and mechanically driven member within said second housing, said second housing having in its lower wall pressure sealing means sealing against said tube member, thereby sealing said reactor core housing from said second housing, said mechanically driven member being located above said head member, said mechanically driven member and said head member having respectively first and second seat surfaces matching each other to form a tight seal when pressed together, said seal defining a low pressure space inside said seat surfaces, said tube member connecting said low pressure space to the interior of said reactor core housing, said head member having an effective pressure bearing area, said device further comprising means for feeding a pressure medium to said second housing outside said seat surfaces to exert a pressure higher than the pressure in said low pressure space on said pressure bearing area, said higher pressure being high enough to press said head member into abutting engagement with said mechanically driven member, and means for relieving said higher pressure to allow said head member to move downwards by action of gravity, said head member being spaced from said side wall of said second housing to provide a pressure medium containing space forming at least one flow passage for pressure medium displaced by said head member during said gravity induced downwards movement of said head member.

2. Control device according to claim 1, said second housing being a hollow cylinder, said mechanically driven member carrying a piston fitting in said cylinder having an upper surface above said seat surfaces, the upper part of said cylinder having a space therein above said upper surface, and means connecting said upper part with said low pressure space inside said seat surfaces.

3. Control device according to claim 1, said head member being dimensioned with respect to said second housing and to the weight of the parts connected to said head member so that its downward movement by action of gravity is braked by the flow resistance of the fluid pressure medium present in said second housing.

4. Control device according to claim 1, said head member being provided with guide means engaging against suitable guiding surfaces inside said second housing.

References Cited

UNITED STATES PATENTS

| | | | |
|---|---|---|---|
| 3,154,472 | 10/1964 | Shannon | 176—36 |
| 3,031,397 | 4/1962 | Fortescue et al. | 176—36 |
| 2,990,356 | 6/1961 | Chapellier et al. | 176—36 |
| 2,855,899 | 10/1958 | Beaty | 176—36 |
| 2,880,155 | 3/1959 | Lichtenberger et al. | 176—36 |
| 3,324,006 | 6/1967 | Challender et al. | 176—36 |

FOREIGN PATENTS 806,757  12/1958  Great Britain.

REUBEN EPSTEIN, *Primary Examiner.*

H. E. BEHREND, *Assistant Examiner.*